(12) United States Patent
Morita et al.

(10) Patent No.: US 7,105,614 B2
(45) Date of Patent: Sep. 12, 2006

(54) CURABLE EPOXY RESIN COMPOSITION

(75) Inventors: Yoshitsugu Morita, Chiba prefecture (JP); Hiroshi Ueki, Chiba Prefecture (JP); Koji Nakanishi, Chiba Prefecture (JP); Haruhiko Furukawa, Chiba Prefecture (JP)

(73) Assignee: Dow Corning Toray Silicone Co., Ltd., (JP)

( * ) Notice: Subject to any disclaimer, the term of this patent is extended or adjusted under 35 U.S.C. 154(b) by 53 days.

(21) Appl. No.: 10/482,323

(22) PCT Filed: Jun. 28, 2002

(86) PCT No.: PCT/JP02/06620

§ 371 (c)(1),
(2), (4) Date: Mar. 1, 2004

(87) PCT Pub. No.: WO03/002662

PCT Pub. Date: Jan. 9, 2003

(65) Prior Publication Data

US 2004/0198925 A1    Oct. 7, 2004

(30) Foreign Application Priority Data

Jun. 29, 2001    (JP) .............................. 2001-199185

(51) Int. Cl.
*C08L 63/00*    (2006.01)

(52) U.S. Cl. ...................... 525/393; 523/427; 523/445; 523/458; 523/468; 523/433; 524/266; 524/268; 525/476; 528/534

(58) Field of Classification Search .................. 525/476
See application file for complete search history.

(56) References Cited

U.S. PATENT DOCUMENTS

| | | | | |
|---|---|---|---|---|
| 5,516,858 A | * | 5/1996 | Morita et al. | 525/478 |
| 5,891,969 A | * | 4/1999 | Mine et al. | 525/476 |
| 5,952,439 A | * | 9/1999 | Morita et al. | 525/476 |
| 2003/0152776 A1 | * | 8/2003 | Kiuchi et al. | 428/413 |

FOREIGN PATENT DOCUMENTS

WO    WO 01/42360 A1 *    6/2001

* cited by examiner

*Primary Examiner*—Marc S. Zimmer
(74) *Attorney, Agent, or Firm*—Robert L. McKellar; McKellar IP Law, PLLC

(57) ABSTRACT

A curable epoxy resin composition comprising at least: (A) a crystalline epoxy resin, (B) a phenol resin, and (C) a silicone resin composed of epoxy-containing organic groups and phenyl groups that define an average unit formula of this component. Component (C) is used in an amount of 0.1 to 500 parts by weight for 100 parts by weight of the sum of weights of components (A) and (B). The composition of the invention is suitable for transfer and injection molding and may find use as a curable epoxy resin composition for sealing parts of electrical and electronic devices.

7 Claims, No Drawings

CURABLE EPOXY RESIN COMPOSITION

This invention relates to a curable epoxy resin composition. More specifically, this invention relates to a curable epoxy resin composition which is characterized by improved moldability, is suitable for the formation of cured products with excellent resistance to combustion, does not contain halogenated epoxy resins or antimony oxides, and therefore does not produce an undesirable impact on human health and environment.

BACKGROUND

Although a curable epoxy resin composition that contains a halogenated epoxy resin or an antimony-type oxide such as an antimony trioxide produces a curable body with good resistance to combustion, when it burns it either generates toxic gases or a toxic antimony trioxide substance, which result in undesired impact on human health and environment. On the other hand, curable epoxy resin compositions that contain aluminum hydroxides, magnesium hydroxides, or similar metal oxides and phosphorus-type flame-retardants, or the like, have low moldability and low resistance to moisture in a cured body.

On the other hand, known in the art are the following compositions: a curable epoxy resin composition prepared from an epoxy resin, a curing agent, and a silicone resin with an epoxy-containing organic group and a phenyl group (see Japanese Unexamined Patent Application Publication (hereinafter referred to as "Kokai") 6-298897 and corresponding U.S. Pat. No. 5,952,439); a curable epoxy resin composition prepared from an epoxy resin, a curing agent, and a silicone resin with an epoxy-containing organic group (see Kokai 9-208806 and corresponding U.S. Pat. No. 5,891,969); and a curable epoxy resin composition prepared from an epoxy resin, curing agent, inorganic filler, and a silicone resin with a phenyl group and an alkoxy group (see Kokai 11-323086).

However, when the inventors of the present invention studied the curable epoxy resin composition disclosed in Kokai 6-298897, they found out that resistance of this composition to combustion can be drastically improved if the epoxy resin is represented by a crystalline epoxy resin and the curing agent is represented by a phenol resin. Furthermore, while studying the curable epoxy resin disclosed in Kokai 9-208806, the inventors of the present invention revealed that, if the amount of phenyl groups is less than 10 mole % relative to the total content of organic groups in the silicone resin, the aforementioned silicone resin cannot be efficiently dispersed in the epoxy resin, and the obtained cured body does not acquire sufficient resistance to combustion. The results of the inventors' study aimed at properties of the curable epoxy resin composition disclosed in Kokai 11-323086 showed that the silicone resin contained in this composition is subject to bleeding and therefore contaminates the mold. In addition, it has poor moldability, and the obtained cured body does not possess sufficient resistance to combustion.

As a result of the aforementioned studies, the inventors arrived at the present invention.

It is an object of the present invention to provide a curable epoxy resin composition which is characterized by good moldability, demonstrates excellent resistance to combustion in a cured body, is free of a halogenated epoxy resin and antimony oxides, and therefore does not produce an unfavorable impact on human health and environment.

THE INVENTION

A curable epoxy resin composition of the present invention comprises at least:
(A) a crystalline epoxy resin,
(B) a phenol resin, and
(C) a silicone resin represented by the following average unit formula:

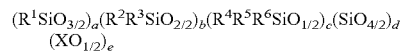

wherein $R^1$, $R^2$, $R^3$, $R^4$, $R^5$, and $R^6$ may be the same or different monovalent hydrocarbon groups or epoxy-containing organic groups, of which said epoxy-containing organic groups constitute 0.1 to 40 mole % of the total amount of $R^1$ through $R^6$ contained in the molecule, and 10 or more mole % are phenyl groups; X is a hydrogen atom or an alkyl group; "a" is a positive number; "b" is 0 or a positive number; "c" is 0 or a positive number; "d" is 0 or a positive number, "e" is 0 or a positive number; "b/a" is a number between 0 and 10; "c/a" is a number between 0 and 0.5; "d/(a+b+c+d)" is a number between 0 and 0.3; and "e/(a+b+c+d)" is a number between 0 and 0.4, component (C) being used in an amount of 0.1 to 500 parts by weight for each 100 parts by weight of the sum of components (A) and (B).

DETAILED DESCRIPTION OF THE INVENTION

The curable epoxy resin composition of the present invention will now be described in more detail.

A crystalline epoxy resin that constitutes component (A) is one of the main components of the composition of the invention. It can be exemplified by a biphenyl type epoxy resin, bisphenol A type epoxy resin, bisphenol F type epoxy resin, stilbene type epoxy resin, biphenylether type epoxy resin, and a biphenylsulfone type epoxy resin. The following are specific examples of the aforementioned epoxy resins:

a biphenyl type epoxy resin of the following general formula:

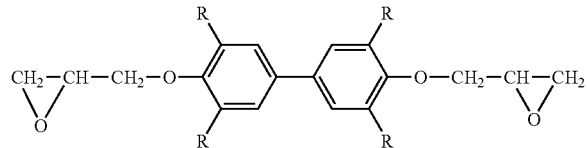

a biphenyl type epoxy resin of the following general formula:

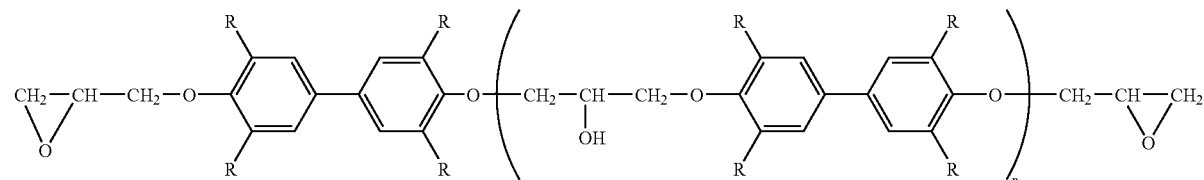

a bisphenol A type epoxy resin of the following general formula:

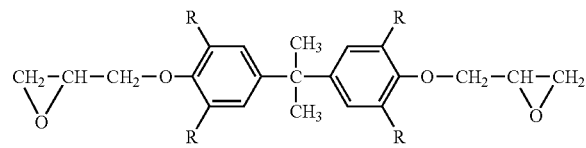

a phenol type epoxy resin of the following general formula:

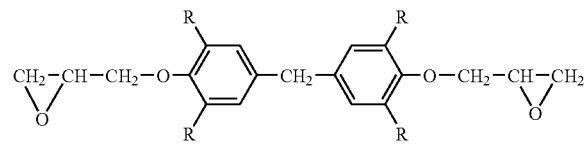

a stilbene type epoxy resin of the following general formula:

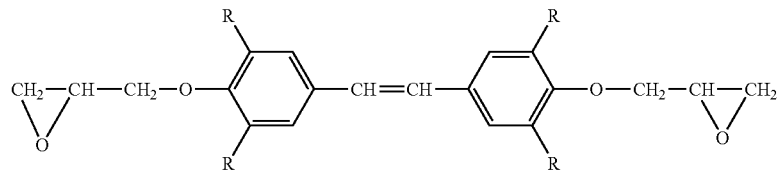

a biphenylether type epoxy resin of the following general formula:

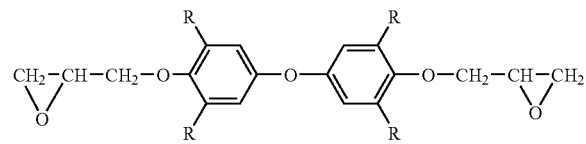

a biphenylsulfone type epoxy resin of the following general formula:

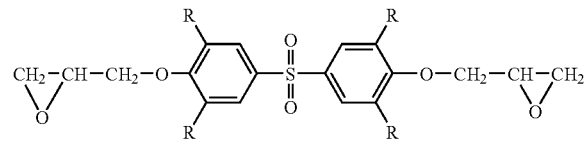

In the above formulae, R may be the same or different and may comprise hydrogen atoms or alkyl groups, wherein alkyl groups of R can be exemplified by methyl groups, ethyl groups, propyl group, i-propyl groups, n-butyl groups, sec-butyl groups, and tert-butyl groups. In the above formulae, "n" is a positive integer. From the point of view of improved moldability and better resistance to combustion in a cured body, it is recommended that the crystalline epoxy resin of component (A) comprise a biphenyl type epoxy resin. Such biphenyl type epoxy resins can be exemplified by 4,4'-bis(2,3-epoxy propoxy)biphenyl, 4,4'-bis(2,3-epoxy propoxy)-3,3',5,5'-tetramethyl biphenyl, 4,4'-bis (2,3-epoxy propoxy)-3,3',5,5'-tetraethyl biphenyl, and 4,4'-bis(2,3-epoxy propoxy)-3,3',5,5'-tetrabutyl biphenyl. The aforementioned epoxy resins are commercially available, see, e.g., YX4000HK type resin of Yuka Shell Epoxy Co., Ltd.

Component (B) is a phenol resin, which in the composition of the invention is used as a curing agent. This component can be exemplified by a phenol-novolac type phenol resin, cresol-novolac type phenol resin, resol-type phenol resin, triphenylalkane type epoxy resin, dicyclopentadiene-modified phenol resin, phenolaralkyl type phenol resin, biphenol type phenol resin, and naphtholaralkyl-type phenol resin. From the point of view of improved resistance to combustion in a cured body, it is recommended that the phenol resin of component (B) comprise a phenolaralkyl type phenol resin. Such a phenolaralkyl type phenol resin can be represented by the following specific compounds:

a phenolaralkyl type phenol resin of the following general formula:

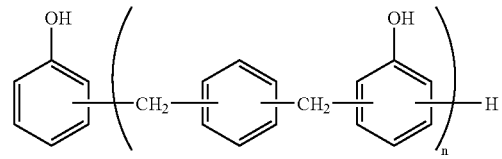

a phenolaralkyl type phenol resin of the following general formula:

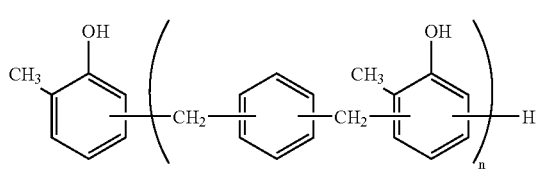

a phenolaralkyl type phenol resin of the following general formula:

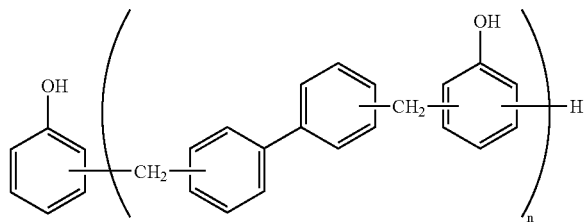

and a phenolaralkyl type phenol resin of the following general formula:

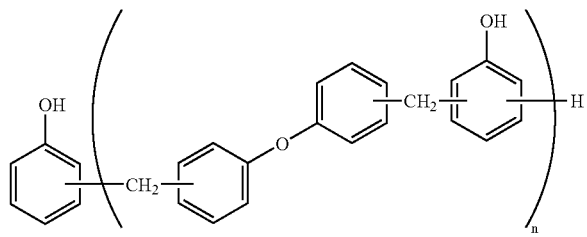

In the above formulae, "n" is a positive integer. Such a phenolaralkyl type phenol resin is commercially available as Milex XLC-3L produced by Mitsui Chemical Co., Ltd.

Although there are no special restrictions with regard to the amount in which component (B) should be used, it is recommended to use it in such an amount that a mole ratio of phenolic hydroxyl groups of component (B) to the epoxy groups of component (A) is within the range of 0.5 to 2.5, preferably, within the range of 0.5 to 1.5.

A silicone resin of component (C) is intended to improve resistance to combustion in a cured body prepared from the composition of the invention. This improvement is achieved without sacrifice of moldability of the composition. The silicone resin of component (C) can be represented by the following average unit formula:

$$(R^1SiO_{3/2})_a(R^2R^3SiO_{2/2})_b(R^4R^5R^6SiO_{1/2})_c(SiO_{4/2})_d(XO_{1/2})_e$$

wherein $R^1$, $R^2$, $R^3$, $R^4$, $R^5$, and $R^6$ may be the same or different monovalent hydrocarbon groups or epoxy-containing organic groups, of which said epoxy-containing organic groups constitute 0.1 to 40 mole % of the total amount of $R^1$ through $R^6$ contained in the molecule, and 10 or more mole % are phenyl groups; X is a hydrogen atom or an alkyl group; "a" is a positive number, "b" is 0 or a positive number; "c" is 0 or a positive number; "d" is 0 or a positive number; "e" is 0 or a positive number; "b/a" is a number between 0 and 10; "c/a" is a number between 0 and 0.5; d/(a+b+c+d)" is a number between 0 and 0.3; and "e/(a+b+c+d)" is a number between 0 and 0.4, component (C) being used in an amount of 0.1 to 500 parts by weight for each 100 parts by weight of the sum of components (A) and (B). The aforementioned monovalent hydrocarbon groups can be exemplified by methyl groups, ethyl groups, propyl groups, butyl groups, pentyl groups, hexyl groups, heptyl groups, or similar alkyl groups; vinyl groups, allyl groups, butenyl groups, pentenyl groups, hexenyl groups, or similar alkenyl groups, phenyl groups, tolyl groups, xylyl groups, naphthyl groups, or similar aryl groups; benzyl groups, phenethyl groups, or similar aralkyl groups, and chloromethyl groups, 3-chloropropyl groups, 3,3,3-trifluoropropyl groups, nonafluorobutylethyl groups, or similar substituted-alkyl groups. The epoxy-containing organic groups can be exemplified by 2,3-epoxy propyl groups, 3,4-epoxy butyl groups, 4,5-epoxy pentyl groups, or similar epoxyalkyl groups, 2-glycidoxyethyl groups, 3-glycidoxypropyl groups, 4-glycidoxybutyl groups, or similar glycidoxyalkyl groups; and 2-(3,4-epoxy cyclohexyl)ethyl groups, 3-(3,4-epoxy cyclohexyl)propyl groups, or similar epoxy cyclohexylalkyl groups. It is required that the aforementioned epoxy-containing organic groups constitute 0.1 to 40 mole % of the total amount of $R^1$ through $R^6$ contained in the molecule. This is because, if the epoxy-containing organic groups are used in an amount below the recommended lower limit, the obtained curable epoxy resin composition will be subject to bleeding during molding, and the cured body produced from this composition will have low flexibility, resistance to moisture, and resistance to thermal shocks. If, on the other hand, the epoxy-containing organic groups are used in an amount above the recommended upper limit, this will impair mechanical properties of the cured body.

From the point of view of improved affinity of components (A) and (B), possibility of dispersion in these components, and improved resistance to combustion in a cured body prepared from the obtained curable epoxy resin composition, it is recommended to use phenyl groups in an amount of not less than 10 mole % relative to the total amount of $R^1$ through $R^6$. In particular, the content of phenyl groups in $R^1$ should be 10 mole % or more, and preferably 30 mole % or more. In the above formula, X is a hydrogen atom or an alkyl group, wherein the aforementioned alkyl group can be exemplified by a methyl group, ethyl group, propyl group, butyl group, pentyl group, hexyl group, and heptyl group.

Furthermore, in the above formula, "a" is a positive number, "b" is 0 or a positive number, "c" is 0 or a positive number, "d" is 0 or a positive number, "e" is 0 or a positive number, "b/a" is a number within the range of 0 to 10, "c/a" is a number within the range of 0 to 0.5, "d/(a+b+c+d)" is a number within the range of 0 to 0.3, and "e/(a+b+c+d)" is a number within the range of 0 to 0.4. If the "b/a" ratio in the silicone resin exceeds 10, this will noticeably decrease the softening point of the resin and impair affinity of components (A) and (B). Furthermore, if the "c/(a+b+c)" ratio in the silicone resin exceeds 0.3, this will impair dispersibility of the resin in components (A) and (B).

Although there are no special restrictions with regard to the weight-average molecular weight of aforementioned component (C), it is recommended to have this molecular weight within the range of 500 to 50,000, preferably within the range of 500 to 10,000. It is recommended to have the softening point of the silicone resin of component (C) between 25° C. and 150° C. This is because, if the softening point is below the recommended lower limit, the silicone resin will be subject to bleeding during molding and will contaminate the mold. Moreover, this will impair mechanical properties in a cured body prepared from the composition. On the other hand, if the softening point exceeds the recommended upper limit, it would be difficult to uniformly disperse the silicone resin in components (A) and (B).

It is recommended to maintain the coefficient of variation of melt viscosity in the silicone resin of component (C), calculated by the following formula, 10% or less:

$$[(\eta^1-\eta^0)/\eta^0]\times 100,$$

wherein: $\eta^0$ is viscosity of the silicone resin when the temperature reaches 160° C.;

$\eta^1$ is viscosity of the silicone resin after maintaining it at 160° C. for 20 min.

Component (C) has to be combined with components (A) and (B) by mixing with heating. If in this case component (C) is a silicone resin that has variation in viscosity exceeding 10% after maintaining it at 160° C. for 20 min., the silicone resin will have a reduced dispersibility, and there will be a risk that a cured body obtained from the curable epoxy resin composition may not acquire a sufficient resistance to combustion. The aforementioned variations in the melt viscosity of component (C) can be reduced, e.g., when the ionized impurities contained in this component are removed by washing component (C) with water.

There are no special restrictions with regard to the method for preparation of aforementioned silicone resin of component (C). For example, this component can be prepared by causing a reaction between a siloxane or silane (I) (which may be represented by one type or a mixture of different types of siloxanes or silanes composed of at least one type of the units selected from the group consisting of (i) units of formula $R^7SiO_{3/2}$, wherein $R^7$ is a monovalent hydrocarbon group, (ii) units of formula $R^8R^9SiO_{2/2}$, wherein $R^8$ and $R^9$ are either the same or different univalent hydrocarbon groups, (iii) units of formula $R^{10}R^{11}R^{12}SiO_{1/2}$, wherein $R^{10}$, $R^{11}$, and $R^{12}$ are either the same or different univalent hydrocarbon groups, and (iv) units of formula $SiO_{4/2}$) and an epoxy-containing alkoxysilane of the below-given general formula (II) or a product of partial hydrolyzation of the aforementioned alkoxysilane:

$$R^{13}R^{14}{}_f Si(OR^{15})_{(3-f)} \qquad (II)$$

wherein $R^{13}$ is an epoxy-containing organic group, $R^{14}$ is a monovalent hydrocarbon group, $R^{15}$ is an alkyl group, and "f" is 0, 1, or 2.

Component (I) used in the process described above is one of the main starting materials. It may comprise a siloxane or silane or a mixture of silanes or siloxanes having at least one unit selected from the aforementioned items (i) through (iv). For example, component (I) may comprise a silane or siloxane composed only of units (i), a silane or siloxane composed only of units (ii), a silane or siloxane composed only of units (iii), a silane or siloxane composed only of units (iv), a siloxane composed of units (i) and (ii), a siloxane composed of units (i) and (iii), a siloxane composed of units (i) and (iv), a siloxane composed of units (i), (ii), and (iii), a siloxane composed of units (i), (ii), and (iv), or a siloxane composed of units (i), (ii), (iii), and (iv). In the above formulae, $R^7$, $R^8$, $R^9$, $R^{10}$, $R^{11}$, and $R^{12}$ may comprise either the same or different univalent hydrocarbon groups, such as methyl groups, ethyl groups, propyl groups, butyl groups, pentyl groups, hexyl groups, heptyl groups, or similar alkyl groups, vinyl groups, allyl groups, butenyl groups, pentenyl groups, hexenyl groups, or similar alkenyl groups, phenyl groups, tolyl groups, xylyl groups, naphthyl groups, or similar aryl groups, benzyl groups, phenethyl groups, or similar aralkyl groups; chloromethyl groups, 3-chloropropyl groups, 3,3,3-trifluoropropyl groups, nonafluorobutylethyl groups, or similar substituted alkyl groups.

It is recommended that 10 mole % or more, and preferably 30 mole % or more of $R^7$ comprise phenyl groups.

The aforementioned silanes or siloxanes of component (I) can be exemplified by a methyltrimethoxysilane, methyltriethoxysilane, ethyltrimethoxysilane, ethyltriethoxysilane, vinyltrimethoxysilane, phenyltrimethoxysilane, 3,3,3-trifluoropropyltrimethoxysilane, dimethyldimethoxysilane, methylphenyldimethoxysilane, methylvinyldimethoxysilane, diphenyldimethoxysilane, dimethyldiethoxysilane, methylphenyldiethoxysilane, tetramethoxysilane, tetraethoxysilane, tetrapropoxysilane, dimethoxydiethoxysilane, and products of hydrolysis and condensation of the aforementioned silanes or siloxanes.

In the above-described preparation process, component (II) is used for introduction of epoxy-containing organic groups. This component comprises an epoxy-containing alkoxysilane of the formula given below or a product of its partial hydrolyzation:

$$R^{13}R^{14}{}_f Si(OR^{15})_{(3-f)}$$

In the above formula, $R^{13}$ may comprise an epoxy-containing organic group, such as a 2,3-epoxy propyl group, 3,4-epoxy butyl group, 4,5-epoxypentyl group, or a similar epoxyalkyl group; a 2-glycidoxyethyl group, 3-glycidoxypropyl group, 4-glycidoxybutyl group, or a similar glycidoxyalkyl group; or a 2-(3,4-epoxycyclohexyl)ethyl group, 3-(3,4-epoxy cyclohexyl)propyl group, or a similar epoxy cyclohexylalkyl group. Furthermore, in the above formula, $R^{14}$ may comprise a univalent hydrocarbon group, such as a methyl group, ethyl group, propyl group, butyl group, pentyl group, hexyl group, heptyl group, or a similar alkyl group; a vinyl group, allyl group, butenyl group, pentenyl group, hexenyl group, or a similar alkenyl group; a phenyl group, tolyl group, xylyl group, naphthyl group, or a similar aryl group; a benzyl group, phenethyl group, or a similar aralkyl group; or a chloromethyl group, 3-chloropropyl group, 3,3,3-trifluoropropyl group, nonafluorobutylethyl group, or a similar substituted alkyl group. In the above formula, $R^{15}$ may comprise an alkyl group, such as a methyl group, ethyl group, propyl group, butyl group, pentyl group, hexyl group, heptyl group, or the like. In the abave formula, "f" is 0, 1, or 2, preferably 0.

The aforementioned epoxy-containing alkoxysilane can be exemplified by a 3-glycidoxypropyl (methyl) dimethoxysilane, 3-glycidoxypropyl (methyl) diethoxysilane, 3-glycidoxypropyl (methyl) dibutoxysilane, 2-(3,4-epoxy cyclohexyl) ethyl (methyl) dimethoxysilane, 2-(3,4-epoxy cyclohexyl) ethyl (phenyl) diethoxysilane, 2,3-epoxy propyl (methyl) dimethoxysilane, 2,3-epoxy propyl(phenyl) dimethoxysilane, 3-glycidoxypropyltrimethoxysilane, 3-glycidoxypropyltriethoxysilane, 3-glycidoxypropyltributoxysilane, 2-(3,4-epoxy cyclohexyl) ethylitrmethoxysilane, 2-(3,4-epoxy cyclohexyl) ethyltriethoxysilane, 2,3-epoxy propyltrimethoxysilane, and 2,3-epoxy propyltriethoxysilane.

In accordance with the preparation method, a reaction is carried out between component (I) and component (II) in the presence of a basic catalyst. This basic catalyst may comprise a catalyst for cohydrolysis of components (I) and (II) component, a catalyst for a condensation reaction, or a catalyst for an equilibrium reaction. The following are examples of the aforementioned basic catalysts, such as a sodium hydroxide, potassium hydroxide, cesium hydroxide, or a similar alkali metal hydroxide; sodium-t-butoxide, potassium-t-butoxide, cesium-t-butoxide, or a similar alkali metal alkoxide; or a sodium silanolate compound, potassium silanolate compound, cesium silanolate compound, or a similar alkali metal silanolate compound. Of these, potassium and cesium basic catalysts are most preferable. If necessary, the reaction of cohydrolyzation and condensation of components (I) and (II) can be carried out with an addition of water. Furthermore, if necessary, upon completion of the reaction between components (I) and (II), the concentration of solids in the reaction product can be adjusted with the use of an organic solvent, and the reaction then can be resumed.

In accordance with the method of the invention, the equilibrium reaction breaks siloxane bonds and causes restoration of the bonds at random. As a result, the obtained epoxy-containing silicone resin acquires a balanced state. If the reaction temperature were too low, it would be difficult to ensure the progress of the equilibrium reaction, and if the reaction temperature is too high, this may cause thermal decomposition of silicon-bonded organic group. Therefore, it is recommended to maintain the reaction temperature within the range of 80 to 200° C., preferably, within the range of 100 to 150° C. By selecting an organic solvent with the boiling point between 80° C. and 200° C., it becomes possible to facilitate the equilibrium reaction under the reflux temperature. The equilibrium reaction can be stopped by neutralizing the basic catalyst. Neutralization can be carried out by adding a gaseous carbonic acid, carboxylic acid, or a similar weak acid. The salt that is formed by neutralization can be easily removed by filtering or washing with water. In the composition of the invention, component (C) should be used in an amount of 0.1 to 500 parts by weight, preferably, 0.5 to 100 parts by weight for each 100 parts by weight of the total weight of components (A) and (B). This is because, if component (C) is used in an amount below the recommended lower limit, the cured body obtained by curing the composition will have a reduced resistance to combustion. On the other hand, if the amount of component (C) exceeds the recommended upper limit, this may impair mechanical properties of the cured body.

Within the range not conflicting with the objects of the present invention, the composition may contain an arbitrary component (D) in the form of inorganic filler. Component (D) may be exemplified by glass fiber, asbestos, alumina fiber, ceramic fiber consisting of alumina and silica, boron fiber, zirconia fiber, silicon carbide fiber, metal fiber, or a similar fibrous filler; fused silica, crystalline silica, precipitated silica, fumed silica, baked silica, zinc oxide, baked clay, carbon black, glass beads, alumina, talc, calcium carbonate, clay, aluminum hydroxide, magnesium hydroxide, barium sulfate, titanium dioxide, aluminum nitride, boron nitride, silicon carbonate, aluminum oxide, magnesium oxide, titanium oxide, beryllium oxide, kaolin, mica, zirconia, or a similar powdered filler. The aforementioned fillers may be used in a combination of two or more. Although there are no special restrictions with regard to the shape and average size of the particles in component (D), from the point of view of improved moldability, it is recommended to choose the spherical fused silica with the average particle size within the range of 5 to 40 μm.

There are no special limitations also with regard to the amount in which component (D) can be used, but, in general, its content should be between 400 and 1200 parts by weight for each 100 parts by weight of the total weight of components (A) through (C). This is because, if component (D) is used in an amount less than the recommended lower limit, the obtained cured body will have an increased coefficient of thermal expansion and will be subject to formation of cracks caused by the generated stress. On the other hand, if the used amount of component (D) exceeds the recommended upper limit, this will lead to a decrease in the composition moldability.

In order to improve dispersibility of components (A) and (D) or adhesive properties of the composition, the latter can be combined with a silane coupling agent, titanate coupling agent, or a similar coupling agent. The aforementioned silane coupling agent can be exemplified with a 3-glycidoxypropyltrimethoxysilane, 3-glycidoxypropylmethyldiethoxysilane, 2-(3,4-epoxy cyclohexyl) ethyltrimethoxysilane, or a similar epoxy-containing alkoxysilane; a N-(2-aminoethyl)-3-aminopropyltrimethoxysilane, 3-aminopropyl triethoxysilane, N-phenyl-3-aminopropyltrimethoxysilane, or a similar amino-containing alkoxysilane; and a 3-mercaptopropyltrimethoxysilane, or a similar mercapto-containing alkoxysilane. The titanate coupling agent may comprise i-propoxytitanium tri(i-isostearate).

For accelerating the curing reaction between components (A) and (B), the composition of the invention may contain a curing accelerator. Such a curing accelerator can be exemplified by a triphenylphosphine, tributylphosphine, tri(p-methylphenyl)phosphine, tri(nonylphenyl)phosphine, triphenylphosphine-triphenylborate, tetraphenylphosphine-tetraphenylborate, or a similar phosphorous-type compound; a triethylamine, benzidyldimethylamine, α-methylbenzidyldimethylamine, 1,8-diazabicyclo {5.4.0} undec-7-ene, or a similar tertiary amine compound; 2-methylimidazol, 2-phenyl imidazole, 2-phenyl-4-methylimidazole, or a similar imidazole type compound.

If necessary, the composition of the invention may be combined with a thermoplastic resin, thermoplastic elastomer, organic synthetic rubber, silicone-type, or a similar stress lowering agent; a carnauba wax, higher fatty acids, synthetic waxes, or similar waxes; carbon black, or a similar coloring agent; halogen trap agents, etc.

There are no special limitations with regard to a method of preparation of the composition of the invention, but, in general, the method consists of uniformly mixing components (A) through (C), if necessary, with other optional components. If an optional component is component (D), components (B) and (C) can be added to the composition and uniformly mixed therewith after component (A) has been preliminarily mixed with component (D). In this case, components (A) and (D) can be formed into an integral blend by adding to them a coupling agent, or by pretreating the surface of component (D) with a coupling agent and then combining it with component (A). The equipment used for the preparation of composition may comprise a uniaxial or a biaxial continuous-action mixer, two-roll mixer, Ross® mixer, or a kneader mixer.

EXAMPLES

A curable epoxy resin composition of the present invention will now be described in more detail by way of practical examples. In the subsequent formulae, "Me" designates methyl groups, "Ph" designates phenyl groups, "Ep" designates 3-glycidoxypropyl groups, and "Pr" designates isopropyl groups. Furthermore, in the following example, values of viscosity corresponds to 25° C. Characteristics of curable epoxy resin compositions and cured body obtained by curing these compositions were evaluated by the methods described below. The composition was cured by first being formed in a transfer press for 2 hours at 175° C. under a pressure of 70 kgf/cm$^2$, and then post-cured for 5 hours at 180° C.

Moldability

Spiral Flow: This characteristic was measured at 175° C. under pressure of 70 kgf/cm² by a method specified in EMMI standards.

Contamination of Mold: After forming 2 mm-thick, 50 mm-diameter disks in 5 continuous shots, the mold was observed with regard to dullness on the chromium-plated working surface of the mold. The following criteria were used for designating results of evaluation: no contamination on the mold—o; the surface becomes slightly dull—Δ; the surface of the mold is contaminated—x.

Burrs Evaluation: The length of burrs was observed by molding the composition in a burr measurement mold (with 20 μm depth of grooves). The following criteria were used for designating results of evaluation: the burrs are smaller than 2 mm—o; the burrs exceed 2 mm but do not exceed 10 mm—Δ; the burrs exceed 10 mm—x.

Resistance to Combustion

LIMITING OXYGEN INDEX (LOI): A 1/16 inch-thick (about 1.6 mm-thick) specimen was prepared, and the minimal concentration of oxygen required for burning was measured with the use of an oxygen index measurement instrument. Following this, an average value of the minimal oxygen concentration was calculated for five specimens.

Burning Time: A 1/16 inch-thick (about 1.6 mm-thick) specimen was prepared in accordance with the provisions specified by the Underwriters Laboratories Inc. in their Standard UL94 (Standard for test for flammability of plastic materials for parts in devices and appliances). An average burning time was determined for five specimens.

The following procedures were used for measuring characteristics of the silicone resin.

Softening Point: The characteristic was measured with the use of a micro-melting point apparatus (the product of Yanagimoto Seisakusho Co., Ltd.) and was determined when, with an increase in the temperate at a rate of 1° C. min., a sample of a solid silicone resin turned into a droplet.

Coefficient of Variation in Melt Viscosity: With the use of a programmable rheometer (Model DV-III, the product of Brookfield Company), a sample of silicone resin was heated with the rate of 2° C. min. from room temperature to 100° C., maintained at 100° C. during 20 min., then heated to 120° C., maintained at 120° C. during 20 min., heated to 140° C., maintained at 140° C. during 20 min., and then heated to 160° C. After the temperature reached 160° C. and was maintained at this temperature for another 20 min., the coefficient of variation in the melt viscosity was calculated by the following formula:

$$[(\eta^1-\eta^0)/\eta^0]\times 100,$$

wherein: $\eta^0$ is viscosity of the silicone resin when the temperature reached 160° C.; and $\eta^1$ is viscosity of the silicone resin after maintaining it at 160° C. for 20 min.

Reference Example 1

A 2000 mL flask equipped with a thermometer and a reflux cooler was loaded with 250 g of water and 400 g of toluene, and then a liquid mixture consisting of 300 g of a phenyltrichlorosilane and 200 g of toluene adjusted to 10° C. was added dropwise. After the addition of the mixture was completed, the mixture was subjected to heating and refluxing for 6 hours, and the toluene solution was separated. The toluene solution was washed with 300 g of water, and the washing procedure was repeated until the washings became neutral. Following this, the toluene was removed by heating under a reduced pressure. The obtained product comprised 177.7 g of a white solid substance.

A 500 mL flask equipped with a thermometer, a Dean-Stark tube, and a refluxing cooler was loaded with 116.0 g of the obtained white solid substance, 20.2 g of 3-glycidoxypropylmethyldimethoxysilane, 12.3 g of dimethyldimethoxysilane, 12.2 g of diphenylsilanediol, 150 g of toluene, and 0.15 g of cesium hydroxide. The mixture was then combined with additional 10.0 g of water. The methanol generated in the obtained system and water were then evaporated by heating. After the distillation of water was over, the system was cooled and again combined with 10.0 g of water. The methanol generated in the system and water were evaporated by heating, and the system was subjected to heating and refluxing during 6 hours. The product was cooled, combined with 0.08 g of an acetic acid, and neutralized. The obtained salt was filtered, and the toluene was evaporated by heating the filtrate under a reduced pressure. The obtained product comprised 145 g of a colorless transparent solid substance. This colorless transparent solid substance had a weight-average molecular weight equal to 2280, a softening point of 79° C., and an epoxy equivalent equal to 1690. A ²⁹Si-NMR spectral analysis confirmed that the obtained product comprised a silicone resin with 3-glycidoxypropyl groups expressed by the formula given below (the content of 3-glycidoxypropyl groups was 7 mole % and the content of phenyl groups was 72 mole % per content of all silicon-bonded organic groups).

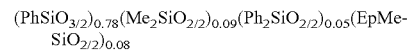

Reference Example 2

Thirty grams of the silicone resin obtained in Reference Example 1 were dissolved in 70 g of toluene. The solution was washed three times with 50 mL of water. The toluene solution was then poured into a 200 mL flask equipped with a Dean-Stark tube, and water was azeotropically removed. The product was cooled, and impurities were filtered out. The toluene was evaporated by heating the filtrate under a reduced pressure. The obtained product comprised 19 g of a colorless transparent solid substance. The analysis showed that the structure of the obtained colorless transparent solid substance was similar to the silicone resin with 3-glycidoxypropyl groups obtained in Reference Example 1. The weight-average molecular weight, softening point, and epoxy equivalent also were the same.

Reference Example 3

A 2000 mL flask equipped with a thermometer and a refluxing cooler was loaded with 250 g of water and 400 g of toluene, and then a mixture of 300 g of a phenyltrichlorosilane and 200 g of toluene adjusted to 10° C. was added dropwise. After the addition was over, the product was subjected to heating and refluxing during 6 hours, and the toluene solution was separated. The obtained toluene solution was several times washed with 300 g of water until the solution was neutralized. The toluene was then evaporated by heating the toluene solution under a reduced pressure. The obtained product comprised 177.7 g of a white solid substance.

A 500 mL flask equipped with a thermometer, a Dean-Stark tube, and a refluxing cooler was loaded with 116.0 g of the obtained white solid substance, 20.2 g of 3-glycidoxypropylmethyldimethoxysilane, 19.1 g of dimethyldimethoxysilane, 150 g of toluene, and 0.15 g of cesium hydroxide. The mixture was then combined with additional 10.0 g of water. A methanol generated in the obtained system and water were then evaporated by heating. After the distillation of water was over, the system was cooled and again combined with 10.0 g of water. A methanol generated in the system and water were evaporated by heating, and the system was subjected to heating and refluxing during 6 hours. The product was cooled, combined with 0.08 g of an acetic acid, and neutralized. The obtained product was washed three times with 80 mL of water. The toluene solution was then poured into a 500 mL flask equipped with a Dean-Stark tube, and water was azeotropically removed. The impurity was filtered out, and the toluene was evaporated by heating the filtrate under a reduced pressure. The obtained product comprised 140 g of a colorless transparent solid substance. This colorless transparent solid substance had a weight-average molecular weight equal to 2600, a softening point of 73° C., and an epoxy equivalent equal to 1620. A $^{29}$Si-NMR spectral analysis confirmed that the obtained product comprised a silicone resin with 3-glycidoxypropyl groups expressed by the formula given below (the content of 3-glycidoxypropyl groups was 7 mole % and the content of phenyl groups was 64 mole % per content of all silicon-bonded organic groups).

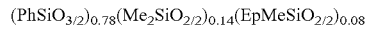

$(PhSiO_{3/2})_{0.78}(Me_2SiO_{2/2})_{0.14}(EpMeSiO_{2/2})_{0.08}$

TABLE 1

| Characteristics | Ref. Ex. | | |
|---|---|---|---|
| | Ref. Ex. 1 | Ref. Ex. 2 | Ref. Ex. 3 |
| Viscosity (cP) when 160° C. is reached | 13.5 × 10$^4$ | 780 | 3300 |
| Viscosity (cP) after holding for 20 min. at 160° C. | 15.2 × 10$^4$ | 782 | 3200 |
| Coefficient of variation of melt viscosity (%) | 12.5 | 0.3 | −3.0 |

Reference Example 4

A 2000 mL four-neck flask equipped with a stirrer, cooler, dripping funnel, and thermometer was filled with 180 g of toluene, 60 g of isopropyl alcohol and 250 g of water. While the mixture was cooled on an ice bath, it was additionally combined with a mixture of 147 g of a phenyltrichlorosilane and 52.8 g of isopropyltrichlorosilane added dropwise. When the addition was over, the mixture was stirred for 30 min. at room temperature and then subjected to 3-hours refluxing for completion of hydrolyzation. The solution was settled in a stationary state, and a water layer was separated. Immediately after this, the procedure consisting of addition of water, stirring, settling in a stationary state, and separation of a water layer was repeated until the washing solution became neutral. The toluene solution was subjected to azeotropic dehydration. The product was cooled, a non-dissolved substance was separated by filtering, and the toluene was evaporated by heating the filtrate under a reduced pressure. The obtained product comprised 115.2 g of a colorless transparent solid substance. This colorless transparent solid substance had a weight-average molecular weight equal to 1600, and a softening point of 80° C. A $^{29}$Si-NMR spectral analysis confirmed that the obtained product comprised a silicone resin expressed by the following structural formula:

$(PhSiO_{3/2})_{0.70}(PrSiO_{3/2})_{0.30}(HO_{1/2})_{0.43}$

Practical Example 1

A curable epoxy resin composition was obtained by fusing and uniformly mixing the following components between two hot rolls: 46.9 parts by weight of a crystalline biphenyl-type epoxy resin (Epikote YX4000H, epoxy equivalent of 190, melting point of 105° C.; the product of Yuka-Shell Epoxy Co., Ltd.); 43.1 parts by weight of a phenolaralkyl-type phenol resin (Milex XLC-3L, the product of Mitsui Chemical Co., Ltd., phenolic hydroxyl group equivalent of 168) (a mole ratio of phenolic hydroxyl groups in the phenol resin per epoxy groups in the aforementioned epoxy resin was 1.0); 9 parts by weight of the silicone resin obtained in Reference Example 1; 510 parts by weight of an amorphous spherical silica with a 14 μm average particle size (FB-48X, the product of Denki Kagaku Kogyo Kabushiki Kaisha); 0.4 parts by weight of carbon black; 1 part by weight of 3-glycidoxypropyltrimethoxysilane; 0.9 parts by weight of carnauba wax; and 0.66 parts by weight of triphenylphosphine. The results of evaluation of the obtained epoxy resin composition and cured bodies produced by curing the composition are shown in Table 2.

Practical Example 2

A curable epoxy resin composition was obtained by fusing and uniformly mixing the following components between two hot rolls: 46.9 parts by weight of a crystalline biphenyl-type epoxy resin (Epikote YX4000H, epoxy equivalent of 190, melting point of 105° C.; the product of Yuka-Shell Epoxy Co., Ltd.); 43.1 parts by weight of a phenolaralkyl-type phenol resin (Milex XLC-3L, the product of Mitsui Chemical Co., Ltd., phenolic hydroxyl group equivalent of 168) (a mole ratio of phenolic hydroxyl groups in the phenol resin per epoxy groups in the aforementioned epoxy resin was 1.0); 18 parts by weight of the silicone resin obtained in Reference Example 1; 510 parts by weight of an amorphous spherical silica with a 14 μm average particle size (FB-48X, the product of Denki Kagaku Kogyo Kabushiki Kaisha); 0.4 parts by weight of carbon black; 1 part by weight of 3-glycidoxypropyltrimethoxysilane; 0.9 parts by weight of carnauba wax; and 0.66 parts by weight of triphenylphosphine. The results of evaluation of the obtained epoxy resin composition and cured bodies produced by curing the composition are shown in Table 2.

Practical Example 3

A curable epoxy resin composition was obtained by fusing and uniformly mixing the following components between two hot rolls: 41.7 parts by weight of a crystalline biphenyl-type epoxy resin (Epikote YX4000H, epoxy equivalent of 190, melting point of 105° C.; the product of Yuka-Shell Epoxy Co., Ltd.); 39.4 parts by weight of a phenolaralkyl-type phenol resin (Milex XLC-3L, the product of Mitsui Chemical Co., Ltd., phenolic hydroxyl group equivalent of 168) (a mole ratio of phenolic hydroxyl groups in the phenol resin per epoxy groups in the aforementioned epoxy resin was 1.1); 9 parts by weight of the silicone resin obtained in Reference Example 2; 510 parts by weight of an amorphous spherical silica with a 14 μm average particle size (FB-48X, the product of Denki Kagaku Kogyo Kabushiki Kaisha); 0.4 parts by weight of carbon black; 1 part by weight of 3-glycidoxypropyltrimethoxysilane; 0.9 parts by weight of carnauba wax; and 0.66 parts by weight of triphenylphosphine. The results of evaluation of the obtained epoxy resin composition and cured bodies produced by curing the composition are shown in Table 2.

Practical Example 4

A curable epoxy resin composition was obtained by fusing and uniformly mixing the following components between two hot rolls: 36.5 parts by weight of a crystalline biphenyl-type epoxy resin (Epikote YX4000H, epoxy equivalent of 190, melting point of 105° C.; the product of Yuka-Shell Epoxy Co., Ltd.); 35.6 parts by weight of a phenolaralkyl-type phenol resin (Milex XLC-3L, the product of Mitsui Chemical Co., Ltd., phenolic hydroxyl group equivalent of 168) (a mole ratio of phenolic hydroxyl groups in the phenol resin per epoxy groups in the aforementioned epoxy resin was 1.1); 18 parts by weight of the silicone resin obtained in Reference Example 3; 510 parts by weight of an amorphous spherical silica with a 14 μm average particle size (FB-48X, the product of Denki Kagaku Kogyo Kabushiki Kaisha); 0.4 parts by weight of carbon black; 1 part by weight of 3-glycidoxypropyltrimethoxysilane; 0.9 parts by weight of carnauba wax; and 0.66 parts by weight of triphenylphosphine. The results of evaluation of the obtained epoxy resin composition and cured bodies produced by curing the composition are shown in Table 2.

Comparative Example 1

A curable epoxy resin composition was obtained by fusing and uniformly mixing the following components between two hot rolls: 46.9 parts by weight of a crystalline biphenyl-type epoxy resin (Epikote YX4000H, epoxy equivalent of 190, melting point of 105° C.; the product of Yuka-Shell Epoxy Co., Ltd.); 43.1 parts by weight of a phenolaralkyl-type phenol resin (Milex XLC-3L, the product of Mitsui Chemical Co., Ltd., phenolic hydroxyl group equivalent of 168) (a mole ratio of phenolic hydroxyl groups in the phenol resin per epoxy groups in the aforementioned epoxy resin was 1.0); 510 parts by weight of an amorphous spherical silica with a 14 μm average particle size (FB-48X, the product of Denki Kagaku Kogyo Kabushiki Kaisha); 0.4 parts by weight of carbon black; 1 part by weight of 3-glycidoxypropyltrimethoxysilane; 0.9 parts by weight of carnauba wax; and 0.66 parts by weight of triphenylphosphine. The results of evaluation of the obtained epoxy resin composition and cured bodies produced by curing the composition are shown in Table 2.

Comparative Example 2

A curable epoxy resin composition was obtained by fusing and uniformly mixing the following components between two hot rolls: 46.9 parts by weight of a crystalline biphenyl-type epoxy resin (Epikote YX4000H, epoxy equivalent of 190, melting point of 105° C.; the product of Yuka-Shell Epoxy Co., Ltd.); 43.1 parts by weight of a phenolaralkyl-type phenol resin (Milex XLC-3L, the product of Mitsui Chemical Co., Ltd., phenolic hydroxyl group equivalent of 168) (a mole ratio of phenolic hydroxyl groups in the phenol resin per epoxy groups in the aforementioned epoxy resin was 1.0); 9 parts by weight of the silicone resin obtained in Reference Example 4; 510 parts by weight of an amorphous spherical silica with a 14 μm average particle size (FB-48X, the product of Denki Kagaku Kogyo Kabushiki Kaisha); 0.4 parts by weight of carbon black; 1 part by weight of 3-glycidoxypropyltrimethoxysilane; 0.9 parts by weight of carnauba wax; and 0.66 parts by weight of triphenylphosphine. The results of evaluation of the obtained epoxy resin composition and cured bodies produced by curing the composition are shown in Table 2.

Comparative Example 3

A curable epoxy resin composition was obtained by fusing and uniformly mixing the following components between two hot rolls: 60 parts by weight of a crystalline orthocrezol novolac type epoxy resin (EOCN1020, the product of Nippon Kayaku Co., Ltd., epoxy equivalent of 195, softening point of 70° C.; 30 parts by weight of a phenol novolac type phenol resin (BTRG558, the product of Showa Highpolymer Co. Ltd., phenolic hydroxyl group equivalent of 100) (a mole ratio of phenolic hydroxyl groups in the phenol resin per epoxy groups in the aforementioned epoxy resin was 1.0); 9 parts by weight of the silicone resin obtained in Reference Example 1; 510 parts by weight of an amorphous spherical silica with a 14 μm average particle size (FB-48X, the product of Denki Kagaku Kogyo Kabushiki Kaisha); 0.4 parts by weight of carbon black; 1 part by weight of 3-glycidoxypropyltrimethoxysilane; 0.9 parts by weight of carnauba wax; and 0.66 parts by weight of triphenylphosphine. The results of evaluation of the obtained epoxy resin composition and cured bodies produced by curing the composition are shown in Table 2.

TABLE 2

| | | Examples | | | | | | |
| | | Practical Examples | | | | Comparative Examples | | |
| Characteristics | | 1 | 2 | 3 | 4 | 1 | 2 | 3 |
|---|---|---|---|---|---|---|---|---|
| Moldability | Spiral flow (inch) | 35 | 48 | 29 | 26 | 29 | 40 | 33 |
| | Mold contamination | ○ | ○ | ○ | ○ | ○ | X | ○ |
| | Burrs Evaluation | ○ | ○ | ○ | ○ | ○ | X | ○ |
| Resistance to combustion | LOI | 40 | 41 | 39 | 44 | 39 | 44 | 30 |
| | Burning time (sec) | 25 | 14 | 22 | 13 | 31 | 43 | ≧40 |

INDUSTRIAL APPLICABILITY

The curable epoxy resin composition of the present invention is characterized by good moldability and excellent resistance to combustion in a cured body molded from the composition. Since the composition is free from halogenated epoxy resins and antimony oxides, it does not produce an undesired impact on human health and environment. The composition of the invention is suitable for transfer and injection molding and may find used as a curable epoxy resin composition for sealing parts of electrical and electronic devices.

What is claimed is:
1. A curable epoxy resin composition comprising:
(A) a crystalline epoxy resin,
(B) a phenol resin,
(C) a silicone resin, and,
(D) an inorganic filler added in an amount of 400 to 1,200 parts by weight for each 100 parts by weight of the total weight of components (A) through (C), said silicone resin represented by the following average unit formula:

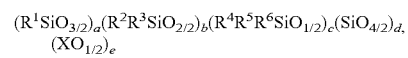

wherein $R^1$, $R^2$, $R^3$, $R^4$, $R^5$, and $R^6$ may be the same or different monovalent hydrocarbon groups or epoxy-containing organic groups, of which said epoxy-containing organic groups constitute 0.1 to 40 mole % of the total amount of $R^1$ through $R^6$ contained in the molecule, and 10 or more mole % are phenyl groups; X is a hydrogen atom or an alkyl group; a is a positive number; b is 0 or a positive number; c is 0 or a positive number; d is 0 or a positive number, e is 0 or a positive number; b/a is a number between 0 and 10; c/a is a number between 0 and 0.5; d/a+b+c+d is a number between 0 and 0.3; and e/(a+b+c+d) is a number between 0 and 0.4, component (C) being used in an amount of 0.1 to 500 parts by weight for each 100 parts by weight of the sum of components (A) and (B).

2. The curable epoxy resin composition of claim 1, wherein said component (A) is a biphenyl type epoxy resin.

3. The curable epoxy resin composition of claim 1, wherein said component (B) is a phenolaralkyl type phenol resin.

4. The curable epoxy resin composition of claim 1, wherein said component (C) has a softening point within the range of 25° C. to 150° C.

5. The curable epoxy resin composition of claim 1, wherein, after holding for 20 minutes at a temperature of 160° C., said component (C) has a coefficient of variation of melt viscosity not exceeding 10%.

6. The curable epoxy resin composition of claim 1, wherein said component (C) has a weight-average molecular weight within the range of 500 to 50,000.

7. The curable epoxy resin composition of claim 1, wherein said component (C) is a silicone resin prepared by causing a reaction between:

(I) a siloxane or silane of one type or a mixture of different types of siloxanes or silanes providing at least one type of the units selected from the group consisting of:

(i) units of the formula $R^7SiO_{3/2}$, wherein $R^7$ is a monovalent hydrocarbon group;

(ii) units of the formula $R^8R^9SiO_{2/2}$, wherein $R^8$ and $R^9$ are either the same or different monovalent hydrocarbon groups;

(iii) units of the formula $R^{10}R^{11}R^{12}SiO_{1/2}$, wherein $R^{10}$, $R^{11}$, and $R^{12}$ are either the same or different monovalent hydrocarbon groups; and (iv) units of the formula $SiO_{4/2}$ and, (II) an epoxy-containing alkoxysilane having the general formula, or a product of partial hydrolysis of the aforementioned alkoxysilane: $R^{13}R^{14}_f Si(OR^{15})_{(3-f)}$ wherein $R^{13}$ is an epoxy-containing organic group, $R^{14}$ is a monovalent hydrocarbon group, $R^{15}$ is an alkyl group, and $f$ is 0, 1, or 2.

* * * * *